(12) United States Patent
Matsumoto

(10) Patent No.: US 12,528,357 B2
(45) Date of Patent: Jan. 20, 2026

(54) ESTIMATING SYSTEM AND ESTIMATION METHOD AND AIRCRAFT

(71) Applicant: HONDA MOTOR CO., LTD., Tokyo (JP)

(72) Inventor: Takeshi Matsumoto, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 337 days.

(21) Appl. No.: 18/186,224

(22) Filed: Mar. 20, 2023

(65) Prior Publication Data

US 2023/0307730 A1 Sep. 28, 2023

(30) Foreign Application Priority Data

Mar. 25, 2022 (JP) .................. 2022-050942

(51) Int. Cl.
| | |
|---|---|
| *B60L 3/00* | (2019.01) |
| *B60L 50/60* | (2019.01) |
| *B60L 58/10* | (2019.01) |
| *B64D 27/34* | (2024.01) |
| *B64D 27/357* | (2024.01) |
| *B64D 31/16* | (2024.01) |
| *H01M 10/48* | (2006.01) |

(52) U.S. Cl.
CPC ............ *B60L 3/0084* (2013.01); *B60L 50/60* (2019.02); *B60L 58/10* (2019.02); *B64D 27/34* (2024.01); *B64D 27/357* (2024.01); *B64D 31/16* (2024.01); *H01M 10/48* (2013.01); *B60L 2200/10* (2013.01); *H01M 2220/20* (2013.01)

(58) Field of Classification Search
CPC .......... H01M 10/48; B60L 58/10; B64D 27/24
See application file for complete search history.

(56) References Cited

U.S. PATENT DOCUMENTS

| | | |
|---|---|---|
| 2002/0030494 A1 | 3/2002 | Araki |
| 2009/0001992 A1 | 1/2009 | Tsuchiya |
| | (Continued) | |

FOREIGN PATENT DOCUMENTS

| | | |
|---|---|---|
| CN | 107450026 A | 12/2017 |
| JP | 2000306613 A | 11/2000 |
| | (Continued) | |

OTHER PUBLICATIONS

Office Action issued for counterpart Japanese Application No. 2022-050942, transmitted from the Japanese Patent Office on Aug. 26, 2025 (drafted on Aug. 21, 2025).

*Primary Examiner* — Minh Q Phan

(57) ABSTRACT

A state of charge estimating system 70 includes: a power generator 40a for supplying power to rotors 20 and 29; a battery 32 for accumulating power supplied from the power generator and also supplying the accumulated power to the rotors; an ECU 25 for detecting a voltage between terminals of the rotors (an inverter 22); and a flight controller 92 for determining if a detection result of the voltage between terminals detected by the ECU 25 is stable over time, and estimating, when it is determined as being stable, state of charge of the battery based on the detection result of the voltage between terminals and a corresponding relation between an open-circuit voltage and state of charge of the battery 32. The state of charge of the battery can be estimated from the corresponding relation between the open-circuit voltage and the state of charge of the battery.

17 Claims, 5 Drawing Sheets

(56) References Cited

U.S. PATENT DOCUMENTS

| | | | | |
|---|---|---|---|---|
| 2016/0252582 | A1* | 9/2016 | Iida | H01M 10/48 |
| | | | | 702/63 |
| 2020/0047900 | A1* | 2/2020 | Zhou | G01R 31/389 |
| 2020/0148376 | A1 | 5/2020 | Kawai | |
| 2023/0312119 | A1* | 10/2023 | Eto | B64D 27/33 |
| | | | | 701/16 |

FOREIGN PATENT DOCUMENTS

| | | |
|---|---|---|
| JP | 2002051470 A | 2/2002 |
| JP | 2002286818 A | 10/2002 |
| JP | 2007178215 A | 7/2007 |
| JP | 2020069975 A | 5/2020 |

* cited by examiner

ESTIMATING SYSTEM AND ESTIMATION METHOD AND AIRCRAFT

CROSS-REFERENCE TO RELATED APPLICATIONS

The contents of the following Japanese patent application(s) are incorporated herein by reference:
NO. 2022-050942 filed in JP on Mar. 25, 2022

BACKGROUND

1. Technical Field

The present invention relates to an estimating system and an estimation method, and an aircraft.

2. Related Art

Conventionally, there is known a vertical takeoff/landing type aircraft (also called as a VTOL aircraft, or simply an aircraft) that performs takeoff/landing by ascending/descending in a vertical direction by using a plurality of takeoff/landing (VTOL) rotors arranged at left and right sides of a fuselage, and flies in a horizontal direction by using a cruise rotor arranged at a rear part of the fuselage. In such an aircraft, a power generator charges a battery with power generated by an engine, and the power charged in this battery is utilized for causing a plurality of rotors to work, and thereby the aircraft flies. A state of charge of the battery can be estimated by using various methods. For example, Patent Document 1 describes about a method for judging a secondary battery as being in a stable state when battery current has been continuously flowing for a certain time or more, and then assuming that a battery voltage is equal to an open-circuit voltage, and estimating SOC based on an open-circuit voltage-SOC characteristic.

PRIOR ART DOCUMENT

Patent Document

Patent Document 1: Japanese Patent Application Publication No. 2007-178215

DESCRIPTION OF EXEMPLARY EMBODIMENTS

Hereinafter, the present invention will be described through embodiments of the invention, but the following embodiments are not for limiting the invention according to the claims. In addition, not all of the combinations of features described in the embodiments may be essential to the solving mean of the invention.

Figure 1:
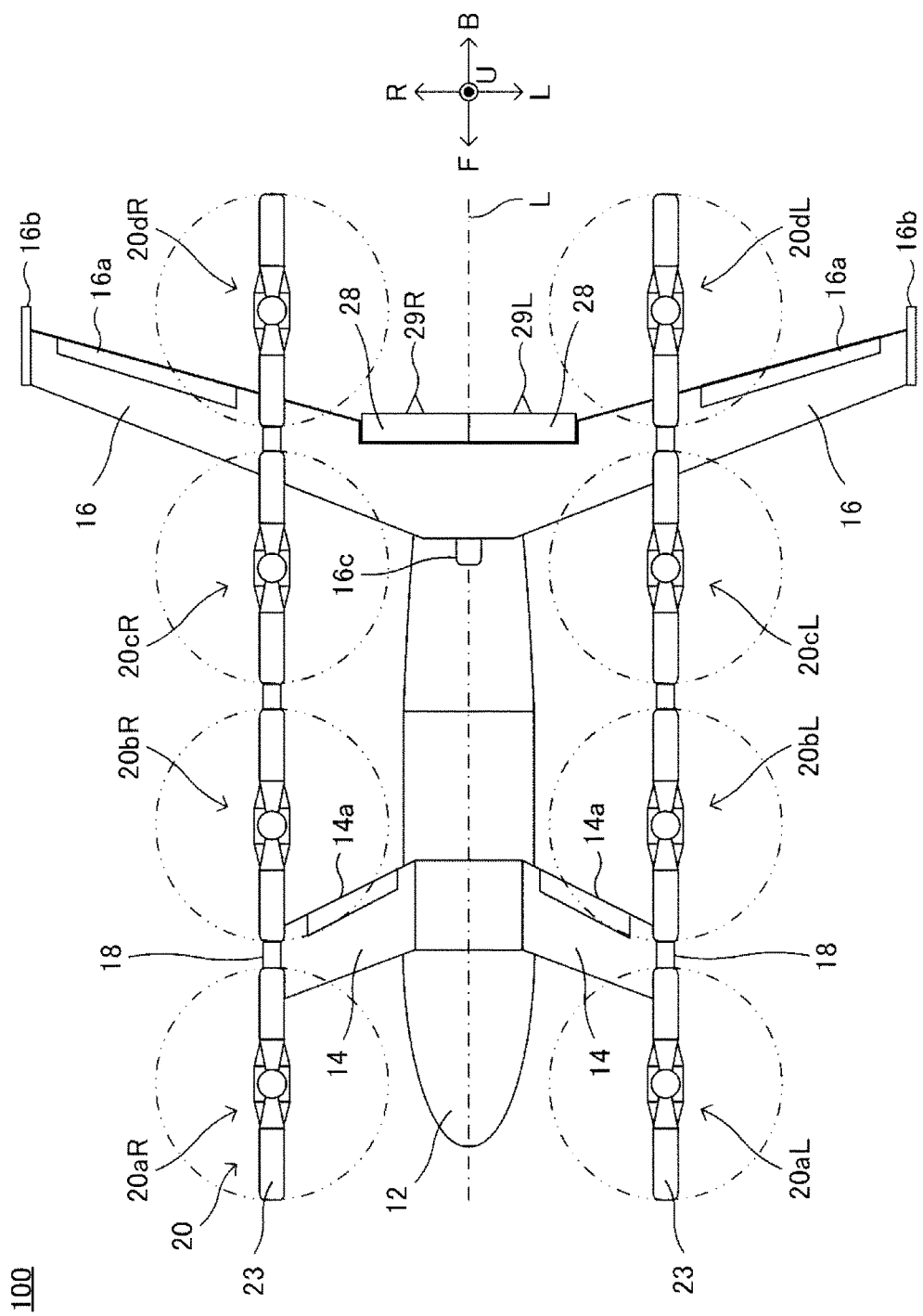
FIG. 1 illustrates structure of an aircraft according to the present embodiment in a top view.

FIG. 1 illustrates structure of an aircraft 100 according to the present embodiment in a top view. The aircraft 100 is a vertical takeoff/landing aircraft including rotors having electric motors as driving sources, which uses a takeoff/landing rotor (also called as a VTOL rotor) 20 for generating a propulsive force and performs takeoff/landing in a vertical direction, and uses a cruise rotor (also called as a cruising rotor) 29 for generating a propulsive force and flies in a horizontal direction. The aircraft 100 is also a hybrid aircraft which can charge a battery 32 by the engine 44, and causes an electric motor to operate by utilizing power generated by a power generator 40a (that is, the engine 44 and a motor generator 42) and power charged to the battery 32.

The aircraft 100 according to the present embodiment is configured in a system in which power is supplied from both of the power generator 40a and the battery 32 to the VTOL rotor 20 and the cruise rotor 29 being loads, so as to be able to estimate a state of charge of a battery based on a voltage between terminals of the loads, and a corresponding relation between an open-circuit voltage and a state of charge of the battery 32. The aircraft 100 includes a fuselage 12, front wings 14, rear wings 16, two booms 18, eight VTOL rotors 20, two cruise rotors 29, a high-voltage system 40 and a communication system 49, and a state of charge estimating system 70.

The fuselage 12 is a structure that provides space for crews and passengers to board, and loading cargoes etc., and also stores devices such as the battery 32, the motor generator 42, and the engine 44. The fuselage 12 is bilaterally symmetric relative to a central axis L, and has a shape that extends in a front-back direction parallel to the central axis L, and is narrow in a left-right direction orthogonal to the central axis L in the horizontal plane. Here, it is defined that the direction parallel to the central axis L is the front-back direction, the left side and the right side in the drawing are front (F) and back (B), respectively, the direction orthogonal to the central axis L in the horizontal plane is a width direction (or the left-right direction), and the upper side and the lower side of the drawing are right (R) and left (L), respectively. In addition, the vertical direction is orthogonal to each of these front-back direction and width direction, and vertically upward and downward directions are also called as upper (U) and lower (L), respectively. The fuselage 12 has a front-end having a round curvature in shape in a top view, and a rear end tapered to some extent against a barrel portion and is parallel to the width direction.

The front wing 14 is a wing body provided to extend laterally from the fuselage 12, and configured to generate lift when cruising, i.e., by moving forward, and functions as a canard of the aircraft 100. The front wing 14 has a V-shape with two wing bodies respectively extending from the center portion to the front-left direction and the front-right direction, and is fixed on the upper portion of the front side of the barrel portion of the fuselage 12 at the center portion with the opening of the V-shaping facing toward the front. The front wing 14 includes elevators 14a arranged in a rear edge on each of the two wing bodies.

The rear wing 16 is a wing body provided to extend laterally from the fuselage 12, and configured to generate lift when cruising, i.e., by moving forward, and functions as a swept-back wing configured to reduce air resistance. The rear wing 16 has a V-shape in which two wing bodies extend from a center portion to a back-left direction and a back-right direction, respectively, and is fixed at the center portion on the upper portion of the rear end of the fuselage 12 via a pylon 16c with the V-shaped opening being directed toward the back. The rear wing 16 includes elevons 16a arranged in a rear edge on each of the two wing bodies and vertical tail wings 16b arranged at tips of the wings.

Here, a wing area of the rear wing 16 is greater than that of the front wing 14, and a wing width of the rear wing 16 is wider than that of the front wing. In this way, the lift generated by the rear wing 16 by moving forward is greater than the lift generated by the front wing 14, and the rear wing 16 functions as a main wing of the aircraft 100. Note that, the wing areas, the lengths or the like of the front wing 14 and the rear wing 16 may be decided based on the balance of the lift generated by each wing, the position of the center of gravity, the posture of the aircraft body when cruising, and the like.

The two booms 18 are structures that are each spaced apart from the fuselage 12 in the left and right directions and supported by the front wing 14 and the rear wing 16, and perform a function of supporting or storing each component of the VTOL rotor 20. The two booms 18 each have a cylindrical shape extending in the front-back direction in a top view and a wing-shaped cross section with the upper side having a round curvature and the lower side tapered in a front view, and are paired and arranged to be bilaterally symmetric with respect to the fuselage 12 (i.e., the central axis L). Note that, the two booms 18 may be formed to extend in the front-back direction and to have an arch-shape curvature in the width direction. The two booms 18 each have a front end positioned ahead of the front wing 14, are each supported on a tip end of the front wing 14 by a front barrel portion (between the two VTOL rotors 20aL and 20bL on the front side and between the two VTOL rotors 20aR and 20bR on the front side), each have a rear end positioned behind the rear wing 16 and are each supported on the rear wing 16 by a rear barrel portion (between the two VTOL rotors 20cL and 20dL on the back side and between the two VTOL rotors 20cR and 20dR on the back side).

The eight VTOL rotors 20 (i.e., 20aL to 20dL, and 20aR to 20dR) are examples of loads that are supplied with power generated by the power generator 40a. The eight VTOL rotors 20 serve as propulsion systems supported by the two booms 18 and generate a propulsive force in the vertical direction at the time of takeoff/landing. Among the eight VTOL rotors 20, the four VTOL rotors 20aL to 20dL are supported at substantially equal intervals by the boom 18 on a left side, and the four VTOL rotors 20aR to 20dR remaining are supported at substantially equal intervals by the boom 18 on a right side. Here, with regard to the VTOL rotors 20aL to 20dL on the left side, the VTOL rotor 20aL is arranged at the forefront, the two VTOL rotors 20bL, and 20cL are arranged between a front wing 14 and a rear wing 16 at the front and back respectively, and the VTOL rotor 20dL is arranged at last. Similarly, with regard to the VTOL rotors 20aR to 20dR on the right side, the VTOL rotor 20aR is arranged at the forefront, the two VTOL rotors 20bR, 20cR are respectively arranged at the front and back between the front wing 14 and the rear wing 16, and the VTOL rotor 20dR is arranged at the end. Among these VTOL rotors 20aL to 20dL on the left side and these four VTOL rotors 20aR to 20dR on the right side, the two left and right VTOL rotors 20aL, 20aR, VTOL rotors 20bL, 20bR, VTOL rotors 20cL, 20cR, and VTOL rotors 20dL, 20dR, which have equal positions in the front-back direction, are each paired and controlled to rotate in opposite directions.

Note that, unless particularly stated, each of the eight VTOL rotors 20aL to 20dL and 20aR to 20dR is simply referred to as a VTOL rotor 20.

Figure 2:
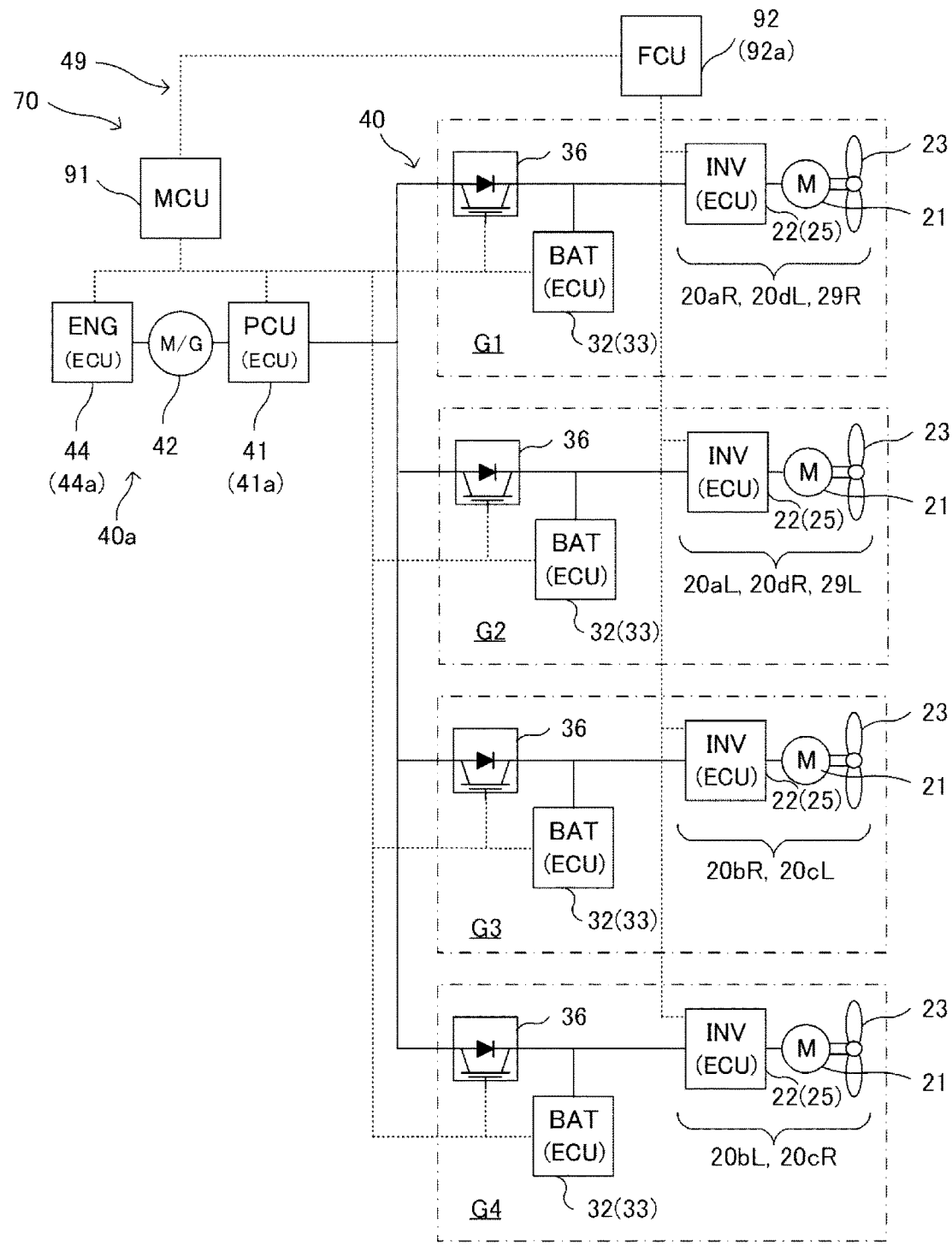
FIG. 2 illustrates structure of a high-voltage system and structure of a communication system.

The VTOL rotor 20 has one or more blades 23, a motor 21, an inverter 22, and an ECU 25 (refer to FIG. 2).

The one or more blades 23 are blade-shaped members that are supported on the boom 18 and configured to rotate to generate a propulsive force in the vertical direction. In the present embodiment, the number of blades 23 is two, but may be any number including one or three or more. The one or more blades 23 are supported at positions higher than the front wing 14 and the rear wing 16. Note that, in FIG. 1, the plane of rotation of the one or more blades 23 of each VTOL rotor 20 is illustrated by using two-dotted lines.

The motor 21 is an electric motor that has a rotation shaft (unillustrated) directed in the upper-lower direction and is configured to rotate the blade 23 fixed to the motor 21 via a transmission (unillustrated) for converting the number of rotations of the rotation shaft. The motor 21 is accommodated in the boom 18.

The inverter 22 is a device configured to receive supply of DC electrical power from the battery 32 via the high-voltage system 40, to convert the DC electrical power into AC electrical power by driving (on/off) a switching element according to a drive signal received from the ECU 25 and to supply the AC electrical power to the motor 21, and is accommodated in the boom 18 together with the motor 21. The inverter 22 can control rotational torque and a rotation speed of the motor 21 respectively by increasing and decreasing the amplitude and frequency of the AC electrical power.

The electronic control unit (ECU) 25 is for: transmitting the drive signal to the inverter 22, and thereby controlling operations of the inverter 22 and modulating the amplitude and frequency of the AC electrical power, as well as managing the power state input to the inverter 22. In the present embodiment, the ECU 25 is equipped in the inverter 22. The ECU 25 is implemented by a microcontroller by way of example, and works by receiving DC electrical power of a low voltage from the battery 32 via a low voltage system (also called as LVS), and shows a control function by executing a dedicated program stored in a memory. Here, the power state input to the inverter 22 includes at least a voltage applied to an input terminal of the inverter 22 (also called as a voltage between terminals), a current that enters into an input end, and a product thereof (i.e., power). The ECU 25 detects the power state input to the inverter 22, and transmits these detection results to a flight controller 92.

The two cruise rotors 29 (i.e., 29L and 29R) are examples of loads that are supplied with power generated by the power generator 40a. The two cruise rotors 29 serve as a propulsion system (refer to FIG. 2) supported at the rear end of the fuselage 12 and generate a propulsive force when cruising. The cruise rotors 29L, 29R have: the one or more blades 23 arranged alongside each other on the left and right sides relative to the central axis L in a cylindrical duct 28 fixed at a rear end of the fuselage 12, which are supported in the duct 28 and generate forward propulsive force by being rotated; the motor 21 having a rotation shaft oriented in the front-back direction, and causing the one or more blades 23 fixed at a tip of this rotation shaft to rotate through the rotation shaft; the inverter 22 for receiving DC electrical power supplied from the battery 32, converting the DC electrical power into AC electrical power, and supplying the AC electrical power to the motor 21; and the ECU 25 for controlling operations of the inverter 22. The inverter 22 can control the rotation speed of the motor 21. Each of these components is formed in the same manner as those in the VTOL rotor 20.

Note that, unless particularly stated, each of the two cruise rotors 29L and 29R is simply referred to as a cruise rotor 29. In addition, unless particularly stated, the VTOL rotor 20 and the cruise rotor 29 are collectively referred to as rotors 20 and 29.

FIG. 2 illustrates structure of a high-voltage system (also called as a power distribution system (PDS)) 40 and structure of a communication system 49.

The high-voltage system 40 is formed including one pair of the power generator 40*a* and four group components G1 to G4. Note that, each of these components is connected to one another via a power line, i.e., a power cable shown with a solid line.

The power generator 40*a* is a power supply for generating power by using the engine 44 based on a target power-generating amount, and supplying the generated power to a load. The power generator 40*a* is formed including the engine (ENG) 44, the motor generator (M/G) 42, and a power control unit (PCU) 41.

The engine 44 is an internal combustion engine such as a reciprocating engine or a gas turbine engine. The engine 44 produces rotational power and outputs the rotational power to the motor generator 42. The engine 44 is controlled by an ECU 44*a* equipped therein.

The ECU 44*a* is a unit for controlling power generation by causing the engine 44 to work based on the target power-generating amount received from the control unit 91. The ECU 44*a* is implemented by a microcontroller by way of example, and works by receiving DC electrical power of a low voltage from the battery 32 via a low voltage system, and shows a control function by executing a dedicated program stored in a memory.

The motor generator 42 is an electric power generator that serves as a starter when starting the engine 44, and also serves as a power generator after the engine 44 is started. A rotation shaft of the motor generator 42 is coupled to an output shaft of the engine 44. The motor generator 42 receives motive power from the engine 44 and generates power, in other words, produces AC electrical power (particularly, three-phase AC electrical power), and outputs the AC electrical power to a PCU 41. Then, the motor generator 42 supplies generated power to the loads, that is, the VTOL rotor 20 and the cruise rotor 29, which produce propulsive forces for flying, via the PCU 41. In addition, when the engine 44 is started, the motor generator 42 receives AC electrical power and produces rotational power, and then outputs the rotational power to the engine 44.

The PCU 41 is a power conversion unit which uses an inverter circuit for converting AC electrical power (particularly, three-phase AC electrical power) input from a primary side into DC electrical power, and outputs the DC electrical power to a secondary side, and also converts DC electrical power input from the secondary side into AC electrical power (particularly, three-phase AC electrical power), and outputs the AC electrical power to the primary side. A primary-side terminal of the PCU 41 is connected to the motor generator 42, and a secondary-side terminal is connected to each of the four group components G1 to G4. The PCU 41 can convert AC electrical power output from the motor generator 42 into DC electrical power and output the DC electrical power toward the each of the four group components G1 to G4, and also convert DC electrical power supplied from batteries 32 included in the four group components G1 to G4 into AC electrical power and output the AC electrical power to the motor generator 42. The PCU 41 is controlled by an ECU 41*a* equipped therein.

The ECU 41*a* is one example of a controlling unit, and is for controlling power generation by causing the PCU 41 to work based on the target power-generating amount received from the control unit 91. The ECU 41*a* is implemented by a microcontroller by way of example, and works by receiving DC electrical power of a low voltage from the battery 32 via a low voltage system, and shows a control function by executing a dedicated program stored in a memory.

Each of the four group components G1 to G4 is an electric component group including any two of the eight VTOL rotors 20 (for the group components G1 to G2, additionally any one of the two cruise rotors 29), and the battery 32 and the switch 36 attached to these rotors. Note that, these components each including the battery 32 are connected via a circuit element such as an electrical power line (an electrical power cable indicated by a solid line), a conductor, and a diode.

The group component G1 includes the VTOL rotors 20*a*R and 20*d*L, the cruise rotor 29R, the battery 32, and the switch 36.

As mentioned above, the VTOL rotors 20*a*R, 20*d*L, and the cruise rotor 29R each has the motor 21 configured to rotate the one or more blades 23, and the inverter 22 configured to receive DC electrical power supplied from the battery 32, to convert the DC electrical power into AC electrical power, and to supply the AC electrical power to the motor 21. These three rotors 20 and 29 are connected in parallel to the battery 32. Note that, in FIG. 2, for simplicity, the VTOL rotors 20*a*R and 20*d*L and the cruise rotor 29R are shown by one rotor.

The battery 32 is an internal power supply which accumulates power generated by the power generator 40*a*, supplies the accumulated power to the engine 44 and starts the engine 44, and also supplies the accumulated power to the rotors 20 and 29 and causes the rotors 20 and 29 to work. The battery 32 accumulates power supplied by the power generator 40*a*, and also supplies the accumulated power to the VTOL rotor 20 and the cruise rotor 29, in other words, to the motor 21 via the inverter 22. Herein, a state of charge of the battery 32 (particularly, a remaining charge amount or a charging rate) is also referred to as a State of Charge (SOC). The battery 32 is connected between the above-described three rotors 20 and 29, and the switch 36. The battery 32 is managed by an ECU 33 equipped therein.

The ECU 33 is one example of a second detecting unit, and is for managing a state of charge (SOC) of the battery 32. The ECU 33 is implemented by a microcontroller by way of example, and works by receiving DC electrical power of a low voltage from the battery 32 via a low voltage system, and shows a control function by executing a dedicated program stored in a memory. Here, the state of charge of the battery 32 includes at least a charge amount (that is, a remaining charge amount, which is also referred to as SOC), a discharging amount (that is, an amount of discharged power), and a temperature. The ECU 33 detects the state of charge of the battery 32 by any method, such as detecting current output from the battery 32 and calculating an integrated amount of the current, or detecting an electric potential of an output end. Its detection result is transmitted to the control unit 91 via a communication line.

The switch 36 is an element for connecting and disconnecting the group component G1 to and from the secondary-side terminal of the PCU 41, and formed including a rectifier device (diode) and a switching element connected in parallel, by way of example. The rectifier device only allows power directed from the PCU 41 into the group component G1 to pass through. The switching element is for causing both ends of the rectifier device to be short-circuited, for example, and a device such as an insulated gate bipolar transistor (IGBT) can be used as the switching element. By turning off the switch 36 (i.e., the switching element), DC electrical power output from the PCU 41 can be sent to the battery 32 and the three rotors 20 and 29 via the rectifier device. Also, by turning on the switch 36, the DC electrical power can be sent from the battery 32 to the PCU 41 via the switching element.

Note that, since the switch 36 includes the rectifier device, the electrical power can be prevented from being supplied from the battery 32 in any group component among the four group components G1 to G4 to other group components while the VTOL rotor 20 and the cruise rotor 29 are working.

The group component G2 includes the VTOL rotors 20$a$L and 20$d$R, the cruise rotor 29L, the battery 32, and the switch 36. Each of these components is configured similarly to those in the group component G1. Note that, in FIG. 2, for simplicity, the VTOL rotors 20$a$L and 20$d$R and the cruise rotor 29L are shown by one rotor.

The group component G3 includes the VTOL rotors 20$b$R and 20$c$L, the battery 32, and the switch 36. Each of these components is configured similarly to those in the group component G1. In FIG. 2, for simplicity, the VTOL rotors 20$b$R and 20$c$L are shown by one rotor.

The group component G4 includes the VTOL rotors 20$b$L and 20$c$R, the battery 32, and the switch 36. Each of these components is configured similarly to those in the group component G1. In FIG. 2, for simplicity, the VTOL rotors 20$b$L and 20$c$R are shown by one rotor.

Note that, in the aircraft 100 according to the present embodiment, although each of the four group components G1 to G4 is provided with one battery 32, i.e., a total of four batteries are provided, the present invention is not limited thereto, and any number of the batteries 32 may be provided. For example, a total of two batteries 32 may be provided, such as one battery 32 for two of the four group components G1 to G4, and a total of eight batteries 32 may be provided, such as two batteries 32 for each of the group components G1 to G4. The number of group components is not also limited to providing a component for the three rotors, and a component may be provided for two rotors or four rotors. Furthermore, each group component may be provided with one or a plurality of batteries 32.

The communication system 49 includes: the flight controller (FCU) 92; the control unit (MCU) 91; the ECU 44$a$ equipped in the engine 44; the ECU 41$a$ equipped in the PCU 41; four switches 36 included in the group components G1 to G4; four ECUs 33 each connected to a battery 32; and ten ECUs 25 each connected to an inverter 22. Those described above are connected via communication lines (that is, communication cables shown with dotted lines) so that they can mutually communicate.

The state of charge estimating system 70 is one example of an estimating system for estimating a state of charge of the battery 32, and formed including the flight controller 92, control unit 91, four ECUs 33, and four ECUs 25 in the controlling unit included in the communication system 49.

The flight controller 92 is one example of a first control unit, and a unit for receiving an operation signal from a crew of the aircraft 100 via an interface 92$a$ such as a control wheel or a thrust lever, and controlling operations of each component. The flight controller 92 is connected to the control unit 91 and each of the ten ECUs 25 via the communication lines. The flight controller 92 is implemented by a microcontroller by way of example, and works by receiving DC electrical power of a low voltage from the battery 32 via a low voltage system, and shows a control function by executing a dedicated program stored in a memory.

For example, when the flight controller 92 receives a command related to steering of the aircraft 100, a command for taking-off or cruising, or the like via the interface 92$a$, the flight controller 92 detects states (such as a number of rotations of the blade 23, and a voltage between terminals of the inverter 22) of the VTOL rotor 20 and the cruise rotor 29 (i.e., the loads) by means of the ECU 25. Then, the flight controller 92 decides a propulsive force (also called as a propulsive force command value) required for each of the VTOL rotor 20 and the cruise rotor 29, and an amount of power (i.e., a target power-supplying amount) required to generate the propulsive force for the each of them based on their states. Then, the flight controller 92 transmits the required propulsive force and amount of power to the ECUs 41 and 44 via the control unit 91, and thereby causes the power generator 40$a$ to produce power necessary for causing the rotors 20 and 29 to work. At the same time, the flight controller 92 transmits the propulsive force command value (or a number of rotations of the rotors 20 and 29 required for generating the propulsive force) to the ECU 25, and thereby causes the switching element of the inverter 22 to operate, and then converts DC electrical power output from the PCU 41 or DC electrical power supplied from the battery 32 into AC electrical power and outputs the AC electrical power to the motor 21. In this way, the motor 21 starts operating and the blade 23 rotates, and thereby it is possible to cause the VTOL rotor 20 and the cruise rotor 29 to generate the commanded propulsive force.

The control unit (MCU) 91 is one example of a second control unit, and is for collectively controlling the controlling units included in the communication system 49. For example, the control unit 91 communicates with the switch 36 and controls operations of its switching elements, transmits a target power-generating amount to the ECU 44$a$ and controls work of the engine 44, and transmits a target power-generating amount to the ECU 41$a$ and controls operations of switching elements of the PCU 41, as well as communicating with the ECU 33 and detecting a state (particularly, state of charge) of the battery 32. The control unit 91 is connected to each of the engine 44, the PCU 41, the four switches 36, and the four ECUs 33 via the communication line. The control unit 91 is implemented by a microcontroller by way of example, and works by receiving DC electrical power of a low voltage from the battery 32 via a low voltage system, and shows a control function by executing a dedicated program stored in a memory.

Particularly, the control unit 91 controls work of the power generator 40$a$ based on detection results for the state of charge and a temperature of the battery 32 detected by the ECU 33, and the target power-supplying amount received from the flight controller 92.

The four ECUs 33 and the ten ECUs 25 are formed in a matter mentioned above.

Figure 3:
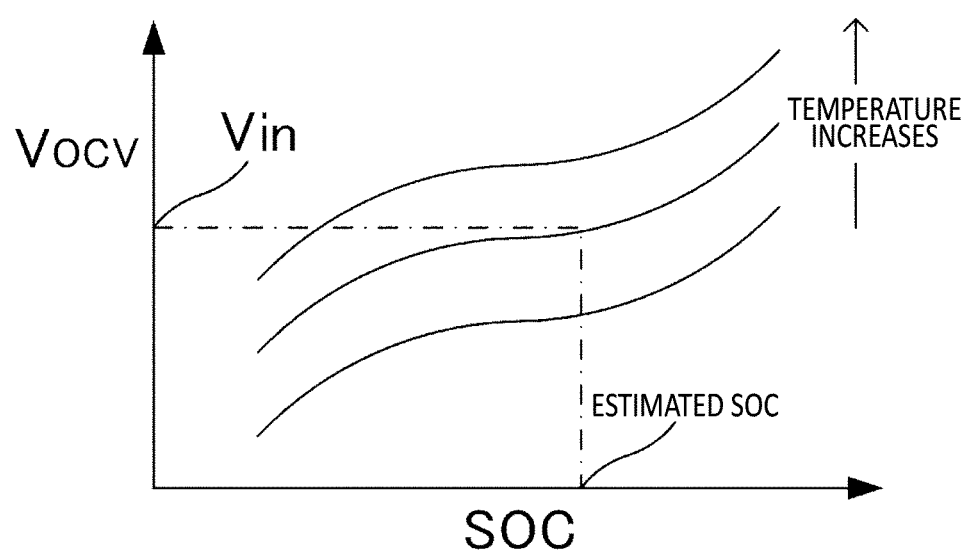
FIG. 3 illustrates one example of a corresponding relation between an open-circuit voltage $V_{OCV}$ and a state of charge SOC of a battery.

FIG. 3 illustrates one example of a corresponding relation between an open-circuit voltage $V_{OCV}$ and a state of charge SOC of the battery 32. Note that, numerical data such as a graph, a function, and a table for representing such corresponding relation between the open-circuit voltage and SOC is referred to as a map, or also called as an open-circuit voltage-SOC map. The battery 32 has such a characteristic that the larger the charge amount (SOC) is, the higher the open-circuit voltage becomes, and the smaller the charge amount is, the lower the open-circuit voltage becomes. The characteristic varies also depending on a temperature of the battery 32.

The open-circuit voltage-SOC map is obtained by charging the battery 32 to its maximum charge amount, and measuring an open-circuit voltage between output terminals of the battery 32 and its charge amount (particularly, remaining amount) while maintaining a temperature of the battery 32 at a constant level and discharging the battery 32. The charge amount can be estimated by integrating a discharging current for example, assuming that a fully charged state is 100% and empty charge state is 0%. A plurality of open-circuit voltage-SOC maps are created within a temperature range possible for the battery 32 to take when the aircraft 100 flies, that is, when the battery 32 works. These open-circuit voltage-SOC maps are retained in the flight controller 92 in advance. Therefore, by detecting or estimating the open-circuit voltage of the battery 32, a state of charge (that is, a remaining charge amount) of the battery 32 can be estimated using the open-circuit voltage-SOC map corresponding to a temperature of the battery 32.

Figure 4:
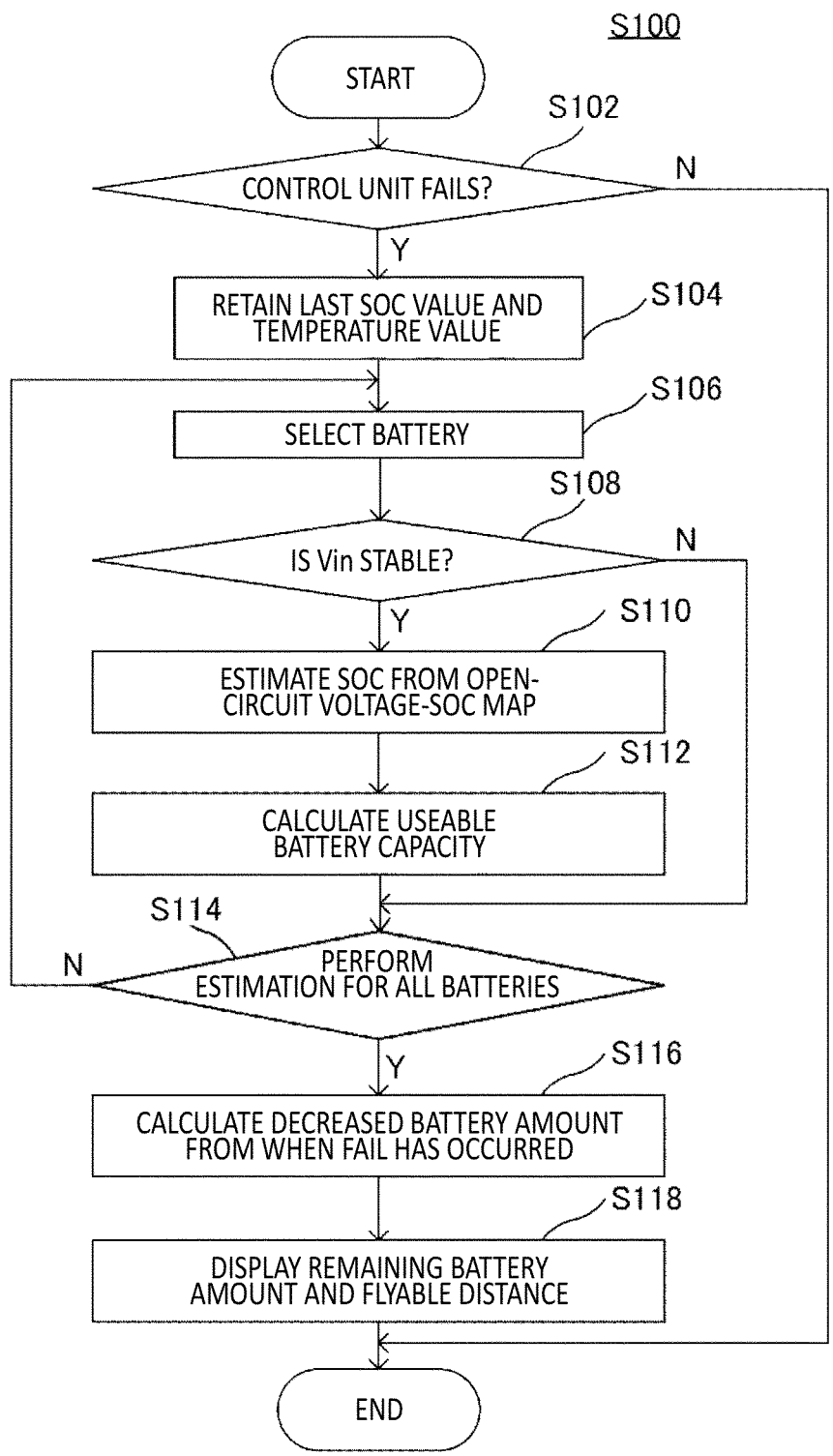
FIG. 4 illustrates a flow of an estimation method for estimating a state of charge of a battery according to the present embodiment.

FIG. 4 illustrates a flow S100 of an estimation method for estimating a state of charge of the battery 32 according to the present embodiment. The flow S100 is executed at regular intervals by the flight controller 92, which constitutes the state of charge estimating system 70.

The flight controller 92 can always obtain a detection result of a state of charge (at least a charge amount and a temperature) of the battery 32 from the ECU 33 via the control unit 91, and displays the detection result on a display screen (unillustrated) for a crew. Also, it is assumed that the flight controller 92 retains a plurality of open-circuit voltage-SOC maps for each of the four batteries 32, which are created for a plurality of temperatures thereof.

In step S102, the flight controller 92 determines whether the control unit 91 has failed. The flight controller 92 can determine the failure based on a fact that the flight controller 92 can no longer receive any signal from the control unit 91, for example. If the control unit 91 fails, the flight controller 92 cannot obtain the detection result of a state of charge of the battery 32 from the ECU 33 via the control unit 91. Therefore, the flow proceeds to step S104 and the state of charge of the battery 32 is estimated using the detection result of the voltage between terminals of the inverter 22, which is detected by the ECU 25. If the control unit 91 is not failed, then the flow S100 ends.

In step S104, the flight controller 92 stores the latest state of charge of the battery 32, particularly, values of a charge amount (i.e., SOC) and a temperature, which is obtained from the ECU 33 via the control unit 91. The flight controller 92 may always record the values of the charge amount (i.e., SOC) and the temperature of the battery 32 obtained from the ECU 33.

In step S106, the flight controller 92 selects a battery 32 of which state of charge is to be estimated from the four batteries 32. For example, a battery 32 included in the group component G1 of which state of charge is not yet estimated is selected.

In step S108, the flight controller 92 obtains a detection result of a power state input to the inverter 22 from the ECU 25, particularly, a voltage applied to an input terminal (also called as a voltage between terminals) Vin, and an input current Iin, and then determines whether the power state is stable over time. At this time, the flight controller 92 obtains the detection result of the voltage Vin between terminals over a predetermined judgement time or more, and determines whether a value of the detection result obtained at least over the judgement time is stable within a predetermined range. If the value of the voltage Vin between terminals is stable, then the flow proceeds to step S110, and if not, the flow proceeds to step S114.

Figure 5:
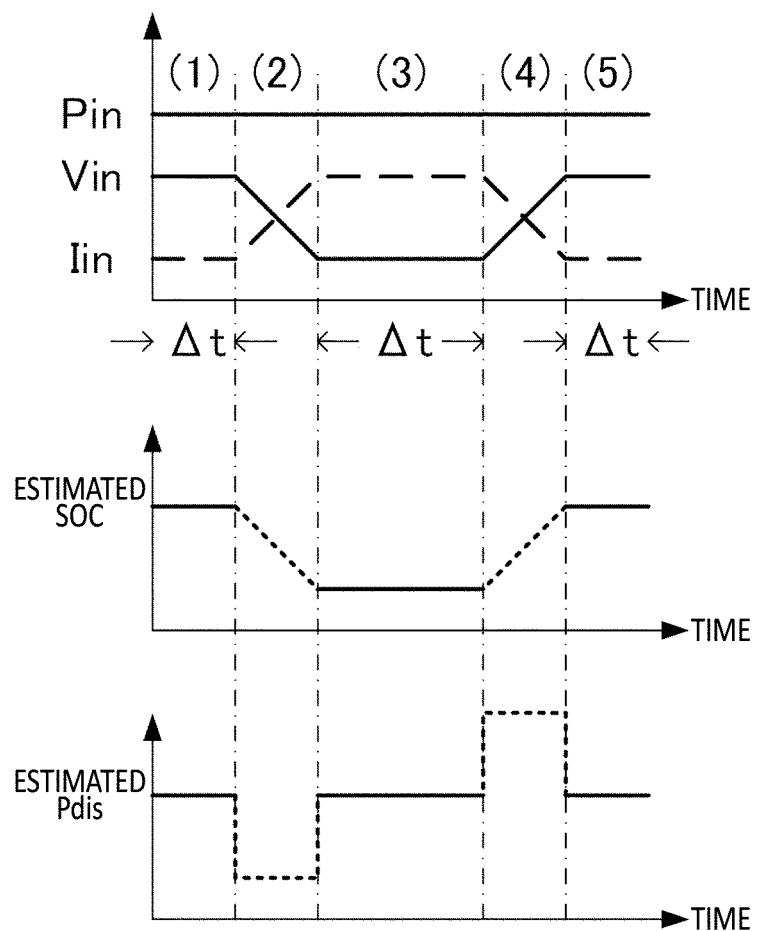
FIG. 5 illustrates examples of time transitions of an input power Pin of an inverter, a voltage Vin between terminals, an input current Iin, an estimated SOC, and an estimated Pdis.

FIG. 5 illustrates examples of: time transitions of an input power Pin, a voltage Vin between terminals, and an input current Iin of the inverter 22 at the top; a time transition of an estimated SOC in the middle; and a time transition of an estimated Pdis at the bottom. The input power of the inverter 22 is obtained from a product of detection results of the voltage Vin between terminals and the input current Iin. The Pdis is an output power from the power generator 40a, specifically, the PCU 41.

In the present example, the voltage Vin between terminals and the input current Iin are stable over a judgement time Δt in a period (1), the voltage Vin between terminals decreases and the input current Iin increases in a period (2), the voltage Vin between terminals and the input current Iin are stable over a judgement time Δt in a period (3), the voltage Vin between terminals increases and the input current Iin decreases in a period (4), and the voltage Vin between terminals and the input current Iin are stable over a judgement time Δt in a period (5). The input power is stable over the periods (1) to (5). When the output power Pdis from the power generator 40a is balanced with the input power Pin of the inverter 22, because there is no power supplied from the battery 32 to the inverter 22, the input voltage Vin becomes stable as in the periods (1), (3), and (5). At this time, the battery 32 can be assumed to be in a pseudo non-loaded state, and therefore the estimation method according to the present embodiment can be applied. When the output power Pdis from the power generator 40a is unbalanced with the input power Pin of the inverter 22, for example, when an output power from the power generator 40a is small, or when an output power from the power generator 40a is large, the voltage Vin between terminals changes as in the periods (2) and (4). This is because when the output power is small, the battery 32 is discharged to the inverter 22, and when the output power is large, power is supplied from the power generator 40a to the battery 32. At this time, the battery 32 is in a loaded-state, and therefore it is not suitable to apply the estimation method according to the present embodiment.

The higher (lower) the voltage Vin between terminals is, the shorter (longer) it may take for the flight controller 92 in a judgement time for determining whether the detection result of the voltage Vin between terminals is stable. If the voltage Vin between terminals is high, the input power Pin may become large, a discharging amount of the battery 32 may become more, and a state of charge of the battery 32 may change rapidly, and therefore, it is necessary to estimate the state of charge in a short time. If the voltage Vin between terminals is low, the input power Pin becomes small, the discharging amount of the battery 32 becomes less, and the state of charge of the battery 32 changes gradually, and therefore, it is possible to estimate the state of charge with high accuracy by taking a long judgement time.

In step S110, the flight controller 92 applies the detection result of the voltage Vin between terminals of the battery 32, which is determined as being stable in step S108, to the open-circuit voltage-SOC map, and thereby estimates the state of charge of the battery 32. At this time, the flight controller 92 selects, from the plurality of open-circuit voltage-SOC maps, an open-circuit voltage-SOC map corresponding to the temperature of the battery 32 stored in step S104 (for example, the line in the middle shown in FIG. 3). The flight controller 92 assumes that the detection result of the voltage Vin between terminals of the battery 32 is equal to an open-circuit voltage of the battery 32, and calculates a charge amount (SOC) from the selected open-circuit voltage-SOC map (in other words, decides the estimated SOC as shown with dashed lines).

In the example in FIG. 5, since the detection results of the voltage Vin between terminals are stable in the periods (1), (3), and (5), it can be assumed that the battery 32 is in a pseudo non-loaded state. Therefore, by applying the detection result of the voltage Vin between terminals to the open-circuit voltage-SOC map, the state of charge (in other words, the estimated SOC) of the battery 32 is estimated as shown with the solid lines. Note that, because the voltage Vin between terminals changes in the periods (2) and (4), and the battery 32 is in a loaded-state, a state of charge of the battery 32 in these periods (shown with the dotted lines) cannot be estimated.

When the voltage Vin between terminals is stable, the battery 32 is not charged/discharged, and it can be assumed that the input power Pin input into the inverter 22 is equal to the output power Pdis from the power generator 40a. Therefore, the flight controller 92 can also estimate, by calculating an input power Pin from the detection results of the voltage Vin between terminals and the input current Iin input to the inverter 22, which are obtained in step S108, an output power Pdis from the power generator 40a from the calculated value.

In step S112, the flight controller 92 calculates a useable charge amount from the charge amount of the battery 32 estimated in step S110.

In step S114, the flight controller 92 determines whether estimation of a state of charge has been completed for all of the batteries 32. If it has not been completed, then the flow returns to step S106, and repeats the steps S108 to S114 so that a state of charge is estimated for all of the batteries 32. If it has been completed, then the flow proceeds to step S116.

In step S116, the flight controller 92 displays the charge amount of the battery 32 recorded in step S104 (i.e., the charge amount immediately before the control unit 91 fails), the charge amount estimated in step S110, and a difference between these charge amounts on a display screen (unillustrated) to a crew. In this way, the crew can understand how much the charge amount of the battery 32 has decreased since the control unit 91 has failed.

In step S118, the flight controller 92 calculates a flyable distance from the useable charge amount (i.e., remaining amount) of each battery 32 calculated in step S112, and displays the flyable distance on a display screen to the crew together with the remaining amount of the battery 32.

When step S118 is completed, then the flow S100 ends.

The estimating system for estimating a state of charge of a battery according to the present embodiment includes: a power generator 40a for supplying power to rotors 20 and 29; a battery 32 for accumulating power supplied from the power generator 40a and also supplying the accumulated power to the rotors 20 and 29; an ECU 25 for detecting a voltage between terminals of the rotors 20 and 29 (i.e., an inverter 22); and a flight controller 92 for determining if a detection result of the voltage between terminals detected by the ECU 25 is stable over time, and estimating, when it is determined as being stable, a state of charge of the battery 32 based on the detection result of the voltage between terminals and a corresponding relation between an open-circuit voltage and a state of charge of the battery 32. In such a system in which power from the power generator 40a and power from the battery 32 are supplied to the rotors 20 and 29 being loads, when power output from the power generator 40a is balanced with power input to the loads and when there is no power input to or output from the battery 32 (in other words, the battery 32 is in a non-loaded state), a voltage between terminals of the loads becomes stable with respect to time. Therefore, the voltage between terminals of the loads is detected by the ECU 25 and when the detection result is stable with respect to time, it is assumed that the voltage between terminals of the loads is equal to an open-circuit voltage of the battery 32, and the state of charge of the battery 32 can be estimated from the corresponding relation between the open-circuit voltage and the state of charge of the battery 32.

The aircraft 100 according to the present embodiment includes the above-described state of charge estimating system 70, and the loads serve as a propulsion system for producing a propulsive force for flying. A state of charge of the battery 32 for supplying power to the propulsion system can be estimated by using an input voltage of the propulsion systems. In this way, even when the ECU 33 for detecting a state of charge of the battery 32, the communication line from the ECU 33 to the control unit 91, or the control unit 91 fails, the flight controller 92 can estimate the state of charge of the battery 32 by using the input voltage of the propulsion system, decide a target power-generating amount for the power generator 40a, and cause the power generator 40a to work appropriately.

An estimation method for estimating a state of charge of a battery 32 according to the present embodiment includes: detecting by an ECU 25, a voltage between terminals of rotors 20 and 29 being loads to which power is supplied from each of a power generator 40a and a battery 32 for accumulating power supplied from the power generator 40a; determining if a detection result of the voltage between terminals detected by the ECU 25 is stable over time; and estimating by the ECU 25, if it is determined as being stable in the determining the state of charge of the battery 32 based on the detection result of the voltage between terminals, and a corresponding relation between an open-circuit voltage and a state of charge of the battery 32. In a system in which power from the power generator 40a and power from the battery 32 are supplied to the rotors 20 and 29 being loads, when power output from the power generator 40a is balanced with power input to the loads and when there is no power input to or output from the battery 32 (in other words, the battery 32 is in a non-loaded state), a voltage between terminals of the loads becomes stable with respect to time. Therefore, the voltage between terminals of the loads is detected by the ECU 25 and when the detection result is stable with respect to time, it is assumed that the voltage between terminals of the loads is equal to an open-circuit voltage of the battery 32, and the state of charge of the battery 32 can be estimated from the corresponding relation between the open-circuit voltage and the state of charge of the battery 32.

While the embodiments of the present invention have been described, the technical scope of the present invention is not limited to the above-described embodiments. It is apparent to persons skilled in the art that various alterations or improvements can be made to the above-described embodiments. It is also apparent from the scope of the claims that the embodiments added with such alterations or improvements can also be included in the technical scope of the present invention.

The operations, procedures, steps, stages, or the like of each processing performed by a device, system, program, and method shown in the claims, specification, or drawings can be performed in any order as long as the order is not specified by a phrase "prior to," "before," or the like and as long as an output from previous processing is not used in later processing. Even if an operation flow is described using phrases such as "firstly" or "secondly" in the claims, specification, or drawings, it does not mean that the process must be performed in this order.

What is claimed is:

1. An estimating system for estimating a state of charge of a battery, comprising:
   a power supply for supplying power to a load;
   a battery for accumulating power supplied from the power supply, and also supplying accumulated power to the load;
   a first detecting unit for detecting a voltage between terminals of the load;
   a first control unit for determining if a detection result of the voltage between terminals detected by the first detecting unit is stable over time, and estimating, when it is determined as being stable, a state of charge of the battery based on the detection result of the voltage between terminals and a corresponding relation between an open-circuit voltage and a state of charge of the battery;
   a second detecting unit for detecting a state of charge of the battery; and
   a second control unit for controlling work of the power supply, based on a detection result of the state of charge of the battery detected by the second detecting unit, and a target power-supplying amount received from the first control unit, wherein
   the first control unit can obtain the detection result of the state of charge of the battery, and when the second control unit fails, the first control unit is configured to estimate a state of charge of the battery by using a detection result of the voltage between terminals detected by the first detecting unit.

2. The estimating system according to claim 1, wherein the first control unit is configured to obtain the detection result of the state of charge of the battery detected by the second detecting unit from the second control unit, and display the detection result that is last obtained and an estimated result of a state of charge of the battery, and a difference between the detection result and the estimated result on a display screen.

3. The estimating system according to claim 1, wherein:
   the corresponding relation between the open-circuit voltage and the state of charge of the battery is shown by a map; and
   the first control unit has a plurality of maps created for a plurality of temperatures of the battery, and is configured to select one map from the plurality of maps depending on a temperature of the battery.

4. The estimating system according to claim 2, wherein:
   the corresponding relation between the open-circuit voltage and the state of charge of the battery is shown by a map; and
   the first control unit has a plurality of maps created for a plurality of temperatures of the battery, and is configured to select one map from the plurality of maps depending on a temperature of the battery.

5. The estimating system according to claim 1, wherein the first control unit is configured to conduct a determination if the detection result of the voltage between terminals detected by the first detecting unit is stable such that the determination is conducted in a shorter time as the voltage between terminals becomes higher.

6. The estimating system according to claim 2, wherein the first control unit is configured to conduct a determination if the detection result of the voltage between terminals detected by the first detecting unit is stable such that the determination is conducted in a shorter time as the voltage between terminals becomes higher.

7. The estimating system according to claim 3, wherein the first control unit is configured to conduct a determination if the detection result of the voltage between terminals detected by the first detecting unit is stable such that the determination is conducted in a shorter time as the voltage between terminals becomes higher.

8. The estimating system according to claim 4, wherein the first control unit is configured to conduct a determination if the detection result of the voltage between terminals detected by the first detecting unit is stable such that the determination is conducted in a shorter time as the voltage between terminals becomes higher.

9. An aircraft, comprising the estimating system according to claim 1, wherein the load serves as a propulsion system for producing a propulsive force for flying.

10. An aircraft, comprising the estimating system according to claim 2, wherein the load serves as a propulsion system for producing a propulsive force for flying.

11. An aircraft, comprising the estimating system according to claim 3, wherein the load serves as a propulsion system for producing a propulsive force for flying.

12. An aircraft, comprising the estimating system according to claim 4, wherein the load serves as a propulsion system for producing a propulsive force for flying.

13. An estimating system for estimating a state of charge of a battery, comprising:
    a power supply for supplying power to a load;
    a battery for accumulating power supplied from the power supply, and also supplying accumulated power to the load;
    a first detecting unit for detecting a voltage between terminals of the load; and
    a first control unit for determining if a detection result of the voltage between terminals detected by the first detecting unit is stable over time, and estimating, when it is determined as being stable, a state of charge of the battery based on the detection result of the voltage between terminals and a corresponding relation between an open-circuit voltage and a state of charge of the battery, wherein
    the corresponding relation between the open-circuit voltage and the state of charge of the battery is shown by a map; and
    the first control unit has a plurality of maps created for a plurality of temperatures of the battery, and is configured to select one map from the plurality of maps depending on a temperature of the battery,
    wherein the first control unit is configured to conduct a determination if the detection result of the voltage between terminals detected by the first detecting unit is stable such that the determination is conducted in a shorter time as the voltage between terminals becomes higher.

14. An aircraft, comprising the estimating system according to claim 13, wherein the load serves as a propulsion system for producing a propulsive force for flying.

15. An estimating system for estimating a state of charge of a battery, comprising:
    a power supply for supplying power to a load;
    a battery for accumulating power supplied from the power supply, and also supplying accumulated power to the load;

a first detecting unit for detecting a voltage between terminals of the load; and a first control unit for determining if a detection result of the voltage between terminals detected by the first detecting unit is stable over time, and estimating, when it is determined as being stable, a state of charge of the battery based on the detection result of the voltage between terminals and a corresponding relation between an open-circuit voltage and a state of charge of the battery, wherein the first control unit is configured to conduct a determination if the detection result of the voltage between terminals detected by the first detecting unit is stable such that the determination is conducted in a shorter time as the voltage between terminals becomes higher.

16. An aircraft, comprising the estimating system according to claim 15, wherein the load serves as a propulsion system for producing a propulsive force for flying.

17. An estimation method for estimating a state of charge of a battery, comprising:

detecting by a first detecting unit, a voltage between terminals of a load to which power is supplied from each of a power supply and a battery for accumulating power supplied from the power supply;

determining if a detection result of the voltage between terminals detected by the first detecting unit is stable over time;

estimating by a first control unit, if it is determined as being stable in the determining, a state of charge of the battery based on the detection result of the voltage between terminals, and a corresponding relation between an open-circuit voltage and a state of charge of the battery;

detecting by a second detecting unit, a state of charge of the battery;

controlling by a second control unit work of the power supply, based on a detection result of the state of charge of the battery detected by the second detecting unit, and a target power-supplying amount received from the first control unit;

obtaining by the first control unit the detection result of the state of charge of the battery; and estimating by the first control unit a state of charge of the battery by using a detection result of the voltage between terminals detected by the first detecting unit when the second control unit fails.

* * * * *